United States Patent
Schrenk et al.

(10) Patent No.: US 12,119,724 B2
(45) Date of Patent: Oct. 15, 2024

(54) STATOR IN AN ELECTRIC MACHINE WITH A WIRING DEVICE AND ELECTRIC MACHINE

(71) Applicant: ZF FRIEDRICHSHAFEN AG, Friedrichshafen (DE)

(72) Inventors: Tobias Schrenk, Bamberg (DE); Christoph Wieder, Küps (DE); Katja Willacker, Wiesentheid (DE); Roland Lindwurm, Sennfeld (DE); Jochen Wittmann, Burkardroth (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 297 days.

(21) Appl. No.: 17/780,691

(22) PCT Filed: Nov. 25, 2020

(86) PCT No.: PCT/EP2020/083277
§ 371 (c)(1),
(2) Date: May 27, 2022

(87) PCT Pub. No.: WO2021/105156
PCT Pub. Date: Jun. 3, 2021

(65) Prior Publication Data
US 2023/0361641 A1    Nov. 9, 2023

(30) Foreign Application Priority Data
Nov. 28, 2019   (DE) ............. 10 2019 218 442.1

(51) Int. Cl.
*H02K 3/52*   (2006.01)
(52) U.S. Cl.
CPC ......... *H02K 3/522* (2013.01); *H02K 2203/09* (2013.01); *H02K 2203/12* (2013.01)

(58) Field of Classification Search
None
See application file for complete search history.

(56) References Cited

U.S. PATENT DOCUMENTS

| | | | | |
|---|---|---|---|---|
| 2003/0201688 A1* | 10/2003 | Yamamura | ............. | H02K 3/522 |
| | | | | 310/71 |
| 2014/0014390 A1* | 1/2014 | Chamberlin | ........... | H02K 3/522 |
| | | | | 174/68.2 |

(Continued)

FOREIGN PATENT DOCUMENTS

| CH | 402 146 | 11/1965 |
|---|---|---|
| DE | 20 53 688 | 5/1971 |

(Continued)

OTHER PUBLICATIONS

Machine Translation of DE 10 2015 225 538 A1 (Year: 2017).*

(Continued)

*Primary Examiner* — Bernard Rojas
(74) *Attorney, Agent, or Firm* — Cozen O'Connor

(57) ABSTRACT

The invention relates to a stator (IO) in an electric machine (I) with a laminated core (II) formed in an annular fashion about a central axis (A), on which core stator coils (16) with coil ends (16*a, b*) are arranged by means of formers (12*a*, 12*b*). The stator (IO) comprises wiring device (20), on which a plurality of mutually isolated connecting conductors (22-26) with coil connection areas (22*a*-26*a*) are present for connecting the stator coils (16). The wiring device (20) is joined on the stator in an axial joining direction to the stator coils (16) and is secured by axial connection means (30*a, b*) to the formers (12*a*), thus forming a plurality of axial connections (32*a, b*). According to the invention, to increase the stiffness of the stator (IO), radial supporting means (40, 41) are additionally formed on the wiring device (20) to interact with the formers (12*a*), said means being designed (Continued)

to be functionally independent of the axial connection means (30*a, b*).

9 Claims, 5 Drawing Sheets

(56) References Cited

U.S. PATENT DOCUMENTS

| | | |
|---|---|---|
| 2014/0113472 A1 | 4/2014 | Chamberlin |
| 2015/0188376 A1 | 7/2015 | Yamaguchi |

FOREIGN PATENT DOCUMENTS

| | | |
|---|---|---|
| DE | 102015225538 | 11/2007 |
| DE | 102009001830 | 10/2010 |
| DE | 10 2014 211 923 | 12/2015 |
| DE | 10 2016 200 115 | 7/2017 |
| DE | 102016215716 | 2/2018 |
| DE | 102016218129 | 3/2018 |
| DE | 102017211168 | 1/2019 |
| DE | 102017216084 | 3/2019 |
| JP | 2007-288821 | 11/2007 |
| WO | WO 2011/108 735 | 9/2011 |
| WO | WO 2019/065142 | 4/2019 |

OTHER PUBLICATIONS

International Search Report issued in corresponding PCT Application No. PCT/EP2020/083277.
German Office Action dated Aug. 7, 2020 issued in corresponding application No. 10 2019 218 442.1.

\* cited by examiner

STATOR IN AN ELECTRIC MACHINE WITH A WIRING DEVICE AND ELECTRIC MACHINE

CROSS REFERENCE TO RELATED APPLICATIONS

This is a U.S. national stage of International application No. PCT/EP2020/083277, filed on Nov. 25, 2020, which claims priority to German Application No. 10 2019 218 442.1 filed Nov. 28, 2019, the content of each of which is incorporated herein by reference.

BACKGROUND OF THE INVENTION

1. Field of the Invention

The present invention relates to a stator of an electric machine having an interconnection device for stator coils.

2. Description of the Related Art

A generic stator having stator coils is known from DE 10 2016 200 115 A1, wherein an interconnection device having a plurality of phase connecting conductors is arranged axially adjacent to stator coils and secured on winding formers by axial connectors. In this case, the axial connectors also serve at the same time for defined radial securing of the interconnection device.

SUMMARY OF THE INVENTION

Starting with this prior art, it is an object of the present invention to further improve a stator of an electric machine having an interconnection device for stator coils of the type mentioned at the outset and such an electric machine. In particular, the aim is to improve the behavior with regard to operational vibrations of the electric machine.

This object may be achieved by a stator having an annular laminated core formed around a center axis is therefore proposed, on which stator coils with coil ends are arranged by winding formers. The stator further comprises an interconnection device having a plurality of mutually insulated connecting conductors, wherein coil connection regions are formed for the interconnection of the stator coils. The interconnection device is joined to the stator coils on the stator in an axial joining direction, arranged adjacent to the stator coils in the assembled state and secured to a plurality of the winding formers by axial connectors to form a multiplicity of axial connections.

According to an aspect of the invention, the stator is distinguished from the prior art in that the interconnection device has radial supports for cooperating with the winding formers, which supports are formed independently of the axial connectors.

The proposed correlating design of the interconnection device and the winding formers has a positive effect in relation to the mechanical and dynamic strength of the entire stator arrangement. Since the interconnection device is attached directly to the stator and forms a functional unit of the stator, it can vibrate with the electric machine during the operation thereof, in particular when the electric machine is used as a drive motor for a motor vehicle. In this case, relative movements between the stator and the interconnection device also occur multiple times, wherein in particular the coil ends are subjected to a high-frequency mechanical alternating load and wire breakages may occur. As a result of the radial support, proposed herein, of the interconnection device, mutual relative movements of the stator coils and the interconnection device can be significantly reduced in the event of vibrations or oscillations, whereby the risk of wire breakages can be notably reduced.

According to the invention, a functional division takes place with regard to the securing of the interconnection device on the winding formers of the stator, wherein axial connectors and radial supports are configured to be functionally independent of one another. The axial connectors therefore serve mainly for realizing and fixing a defined axial position of the interconnection device. The radial supports accordingly serve mainly for realizing and fixing a defined radial position of the interconnection device and, in particular, reducing and preventing a periodic bending stress of the coil ends, which occurs due to mutual radial movements of the coils with respect to the interconnection device and as a consequence thereof. A radial load on the axial connectors can thus be significantly reduced. At the same time, as a result of the design of independent radial supports, an improved radial positioning of the interconnection device on the stator can be achieved on a permanent basis.

The axial connections can advantageously have a radial gap for generating a radial play. This means that the axial connecting partners, upon a mutual radial movement, permit a mutual radial play without notably influencing the radial position of the other connecting partner in each case. There is no need to realize a particular radial dimensional accuracy of the axial connectors. The connectors can thus be uncoupled and relieved from possible residual radial displacements of the interconnection device with respect to the coils in a further improved manner.

According to an advantageous configuration of the stator, a winding former can have a winding region, which is formed by a winding carrier and two limbs delimiting the winding region in the axial direction and connected to the winding carrier. In this case, the axial connectors can be formed on the limbs of the winding formers. The radial supports can furthermore cooperate with at least one of the limbs of the plurality of winding formers. The radial supports of the interconnection device can act radially on one side or radially on both sides. To this end, the radial supports can be formed once or multiple times, in particular twice, and accordingly cooperate with one or with both limbs of a winding former. One of the said supports can act on a limb of a winding former on the radially inner side and/or radially outer side and fix the interconnection device in a predetermined radial position on the stator.

A particular configuration provides that, in particular to achieve a high rigidity of the stator, the radial supports are configured to cooperate with both limbs on one of the winding formers and form a first and, if necessary, a second support region. In this case, it has proven expedient to perform a centering of the interconnection device with respect to the stator coils by only one of the two support regions. In the ideal case, i.e. when a precisely annular interconnection device and/or arrangement of the winding formers is present, the components, in a specified mutual axial position, move into mutual contact with only one of the support regions in a centering manner. If the interconnection device and/or the arrangement of the winding formers deviates from an ideal annular form as a result of manufacturing and assembly tolerances and one of the components is deformed so as to be slightly elliptical, for example, the surfaces cooperating to form the second support region can likewise move into mutual contact with the winding formers and bring about radial securing there.

The above-mentioned concept can be realized for example in that the supports have a first support surface and a second support surface radially spaced from the first support surface. In this case, the first support surfaces and a guide portion, cooperating therewith, of one of the limbs extend parallel to the center axis, i.e. along the axial joining direction of the interconnection device, and form the first support region. The second support surface and a contact portion, cooperating therewith, of the other limb are, on the other hand, constructed at an angle with respect to the center axis and, if necessary, form the second support region. In this way, during the axial joining of the interconnection device, a predefined radial positional relationship between the first support surface and the guide portion can be generated, which is independent of a mutual axial position of the connecting partners. On the other hand, if necessary, a radial positional relationship is generated between the second support surface and the second contact portion, which positional relationship is less predefined than the positional relationship explained above and is therefore radially variable within specified limits. The radial position generated during the joining procedure is in particular dependent on the radial manufacturing and/or assembly tolerances of the joining partners which exist in practice.

To prevent an undesired excessive mechanical load, it is advantageous to arrange the coil connection regions of the connecting conductors adjacent to the first support region. The coil ends and their contact points are thus fixed in position on the coil connecting regions in a particularly effective manner and protected from wire breakages. In particular, it is advantageous to arrange the coil connection regions spatially nearer to the first support region than to the second support region. The coil connection regions of the connecting conductors can advantageously be arranged in particular adjacent to the support region bringing about the centering of the interconnection device.

The support regions of the interconnection device can essentially abut against a winding former on the radially inner side and/or radially outer side. A solution which is particularly space-saving in the radial direction provides for the support regions to be formed radially between the axial connectors. According to yet a further spatial optimization of the arrangement, the two coil ends of a coil can exit the winding region at the same limb of one of the winding formers. In this case, the first support region can be formed in a space-saving manner on the stator in the circumferential direction, between these coil ends of the limbs.

According to yet a further expedient configuration of the invention, to secure the mutual axial position of the interconnection device and the coil formers, axial stops which act axially on both sides can be provided, between which the interconnection device is secured substantially without play and which are themselves formed by the axial connectors.

An electric machine having a rotor and having a stator is furthermore proposed, wherein the stator has at least one of the features explained above.

BRIEF DESCRIPTION OF THE DRAWINGS

The invention is explained by way of example below with reference to an embodiment illustrated in the figures, in which.

DETAILED DESCRIPTION OF THE PRESENTLY PREFERRED EMBODIMENTS

Figure 1:
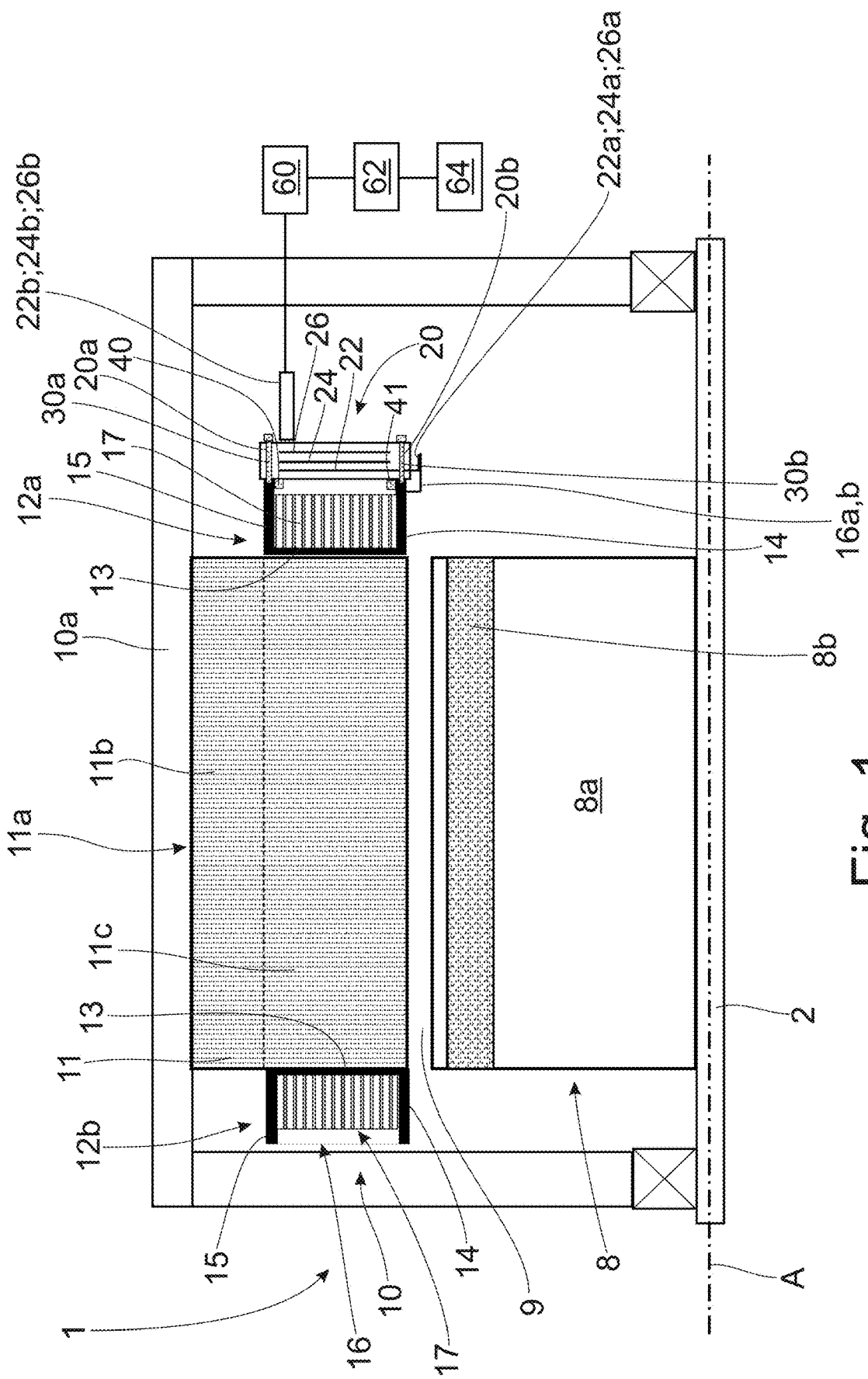
FIG. 1 shows a schematic illustration of an upper half plane of an electric machine with a stator and an interconnection device.
Figure 2:
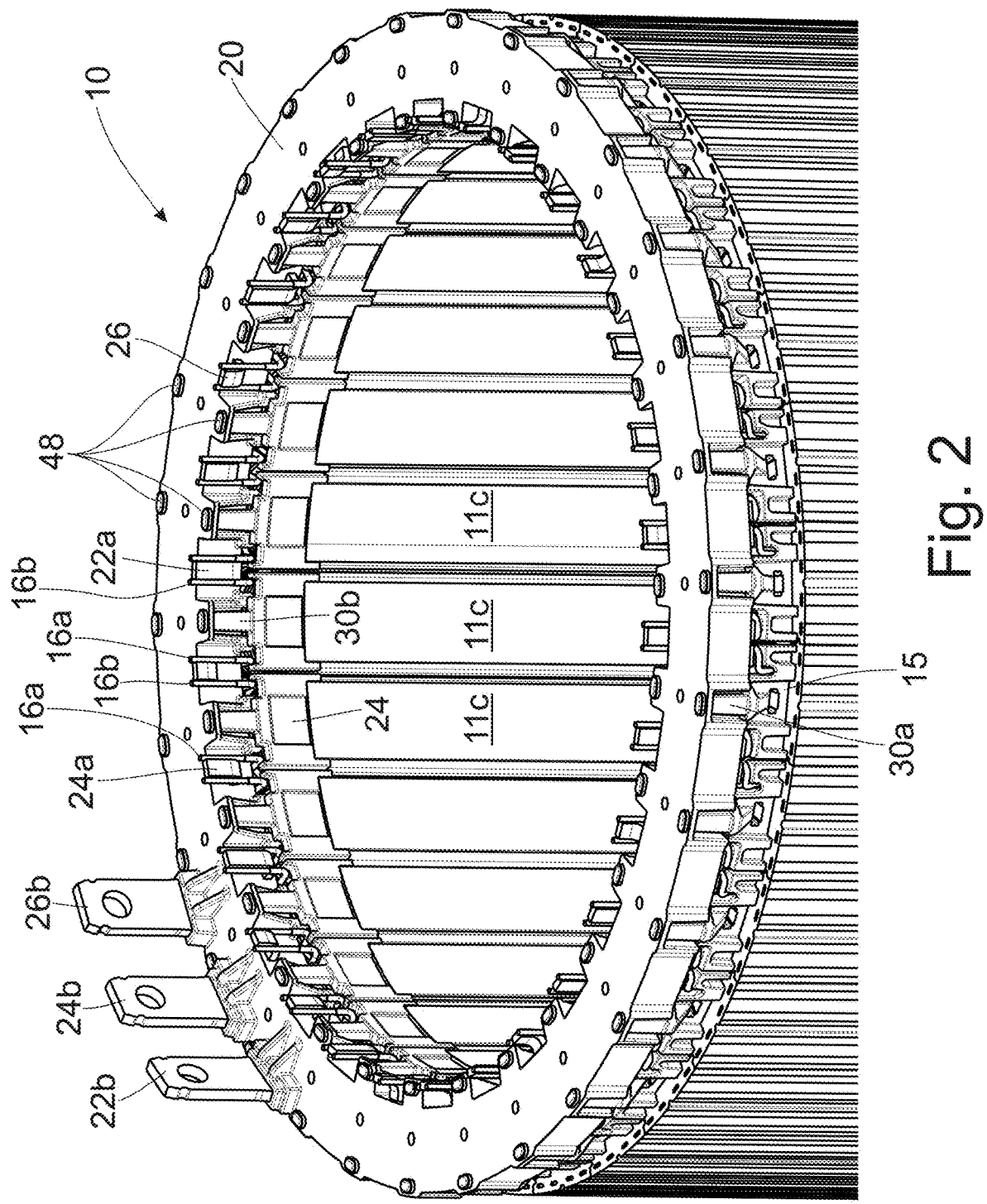
FIG. 2 shows a perspective partial illustration of the stator, looking onto the interconnection device.
Figure 3:
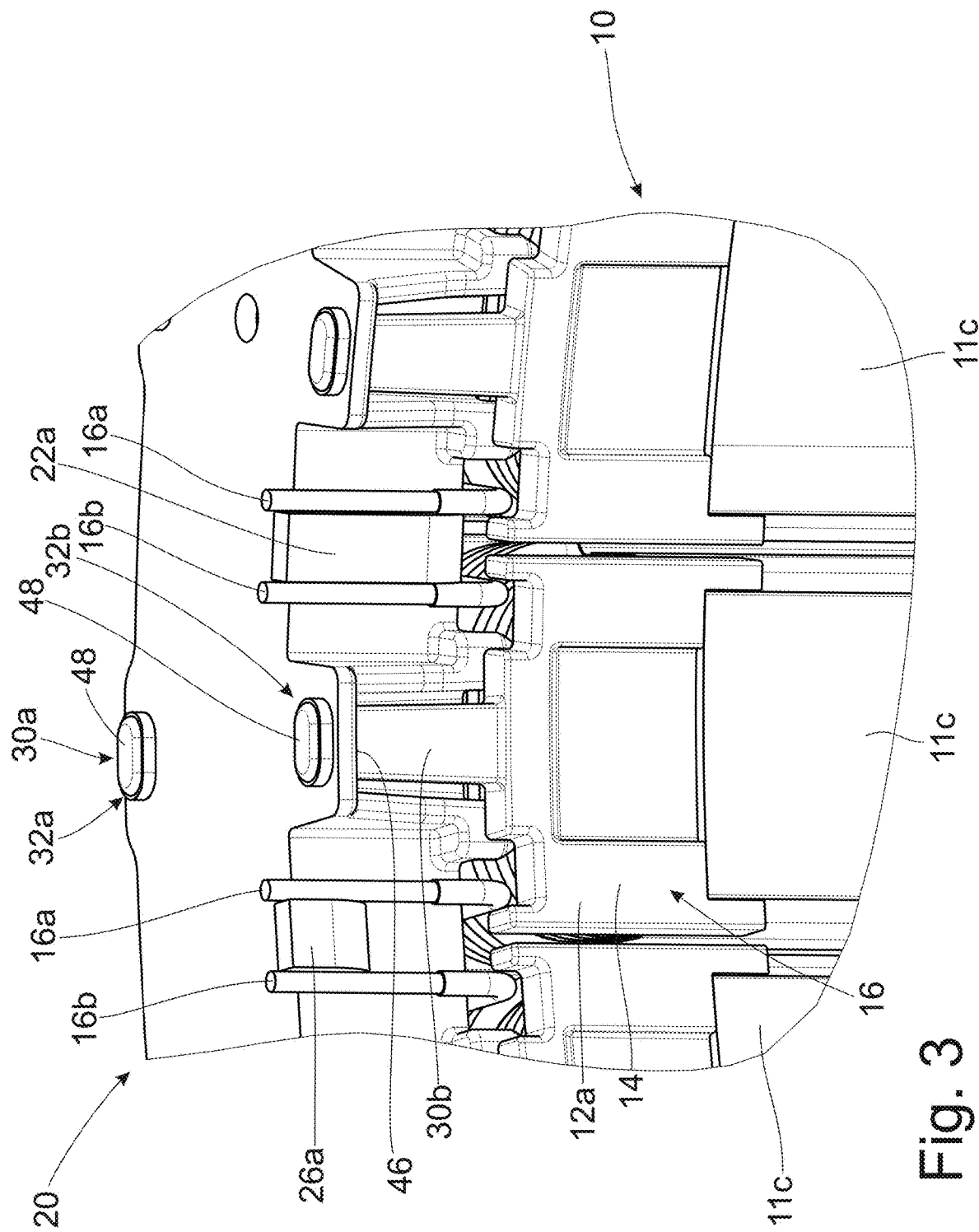
FIG. 3 shows an enlarged detail of the illustration of FIG. 2, looking onto a radially inner region of the stator.

FIG. 1 shows, in a schematic and simplified illustration, an electric machine 1 which, in the present case, is formed merely by way of example as a permanently excited electric synchronous machine in an inner rotor design. The electric machine 1 is constructed in particular for use as a vehicle drive of a hybrid or electric vehicle and can therefore be arranged in a drive train of such a vehicle.

The electric machine 1 firstly has a rotor 8, which is rotatable about a rotor shaft 2 with an axis of rotation A and is surrounded radially externally by a stator 10, forming a radial air gap 9. The rotor 8 comprises a laminated rotor core 8*a* having a multiplicity of permanent magnets 8*b* which are mutually spaced around the circumference. The stator 10 comprises an annular stator carrier 10*a*, in the central recess of which an annular laminated core 11, likewise formed from lamination sheets, is arranged. In the present case, the laminated core 11 is constructed in a segmented manner in the circumferential direction and composed of a multiplicity of identical stator segments to form a closed ring. The axis of rotation A therefore at the same time forms the center axis A of the machine 1. The stator carrier 10*a*, as illustrated in FIG. 1, can simultaneously represent an outer housing or an intermediate housing of the electric machine 1.

The laminated core 11 comprises an annular stator yoke, which abuts against the stator carrier 10*a*, and teeth which project radially inwards from said stator yoke and are fitted with a plurality of stator coils 16 to form a stator winding. The stator coils 16 here are configured as single tooth coils and are wound around the teeth 11*c* as a copper wire with the aid of two insulating or winding formers 12*a*, 12*b* consisting of a heat-resistant plastic material and secured against slipping there. The winding formers 12*a*, *b* comprise in each case a base region or winding carrier 13 abutting against the laminated core 11 at the end face and two limbs 14, 15, which project at an approximate right angle from said base region or winding carrier and axially on the stator 10 and which delimit a winding region 17 in the radial direction. At the end faces of the stator 10, the stator coils 16 therefore form winding heads, which protrude axially on the laminated core 11.

The coils 16 are associated with electrically individual stands, wherein the coil ends 16*a, b* are interconnected with one another in predetermined manner by an interconnection device 20 which is illustrated merely schematically in FIG. 1. To this end, the interconnection device 20 comprises a plurality of mutually insulated connecting conductors 22, 24, 26, which have circumferentially spaced coil connection regions 22*a*, 24*a*, 26*a* for establishing contact with the coil ends 16*a*, 16*b*. In the present case, the interconnection device 20 is configured as a prefabricated metal/plastic composite element, in which the connecting conductors 22, 24, 26, apart from the coil connection regions 22*a*, 24*a*, 26*a*, are overmolded with a plastic material and the inner and outer circumferential surface and the end faces are thus covered with plastic material.

As can be seen in FIG. 1, the interconnection device 20 is joined to the stator coils 16 in an axial joining direction and is arranged immediately axially adjacent thereto. The interconnection device 20 is furthermore connected via power connection regions 22b, 24b, 26b of the connecting conductors 22-26 to power electronics 60 and control electronics 62 having an electrical energy source 64, which can apply a current with a variable phase and amplitude to the stator coils 16 for operation of the electric machine 1.

The connecting conductors 22-26 are produced as annular disks from a copper semi-finished product, in particular from a copper plate or a copper sheet, by punched and shaping processes. As illustrated in FIG. 1, the annular disks are arranged on the stator 16 so as to be coaxial to the center axis A and are stacked axially with respect to one another.

In the exemplary embodiment explained here, the coil connection regions 22a-26a are constructed on the radially inner circumferential region of the connecting conductors 22-26 and aligned axially like the coil ends 16a, b. In this case, the coil connection regions 22a, 24a, 26a and the coil ends 16a, b are positioned parallel to one another and are located on one and the same pitch circle for interconnection purposes. The power connection regions 22b, 24b, 26b are formed on the interconnection device 20 as axially protruding connection tabs 2 made from copper, which are constructed in one part with the connecting conductors 22-26 or, in the case of a multi-part design, can preferably be soldered or welded thereto.

In the illustrated exemplary embodiment, the coil ends 16a, b are connected to the connecting conductors 22-26 by a delta connection. The winding start with the coil end 16a and the winding end with the coil end 16b both exit the winding region 17 of a coil 16 from the radially inner side. For interconnection purposes, two adjacent coil ends 16a, b of two adjacent coils 16 on the circumference are in each case also connected to mutually immediately adjacent coil connection regions 22a, 24a, 26a of one of the connecting conductors 22-26. The contacting of the coil ends 16a, b by the connecting conductors 22-26 takes place with material fit, in particular by soldering or welding.

Figure 4:
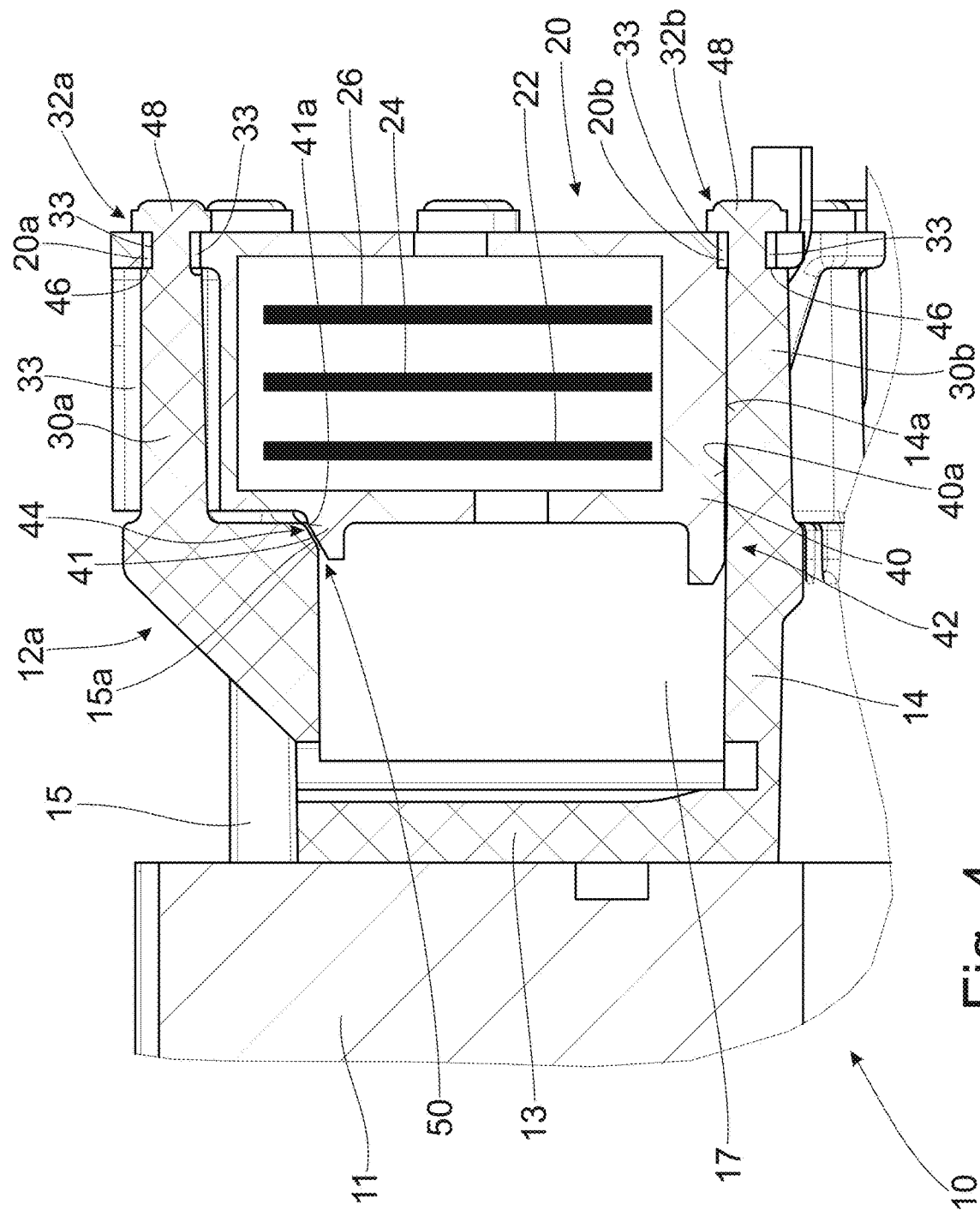
FIG. 4 shows an axial sectional illustration of the stator of FIG. 2 in a plane of axial connectors of a winding former with the interconnection device.
Figure 5:
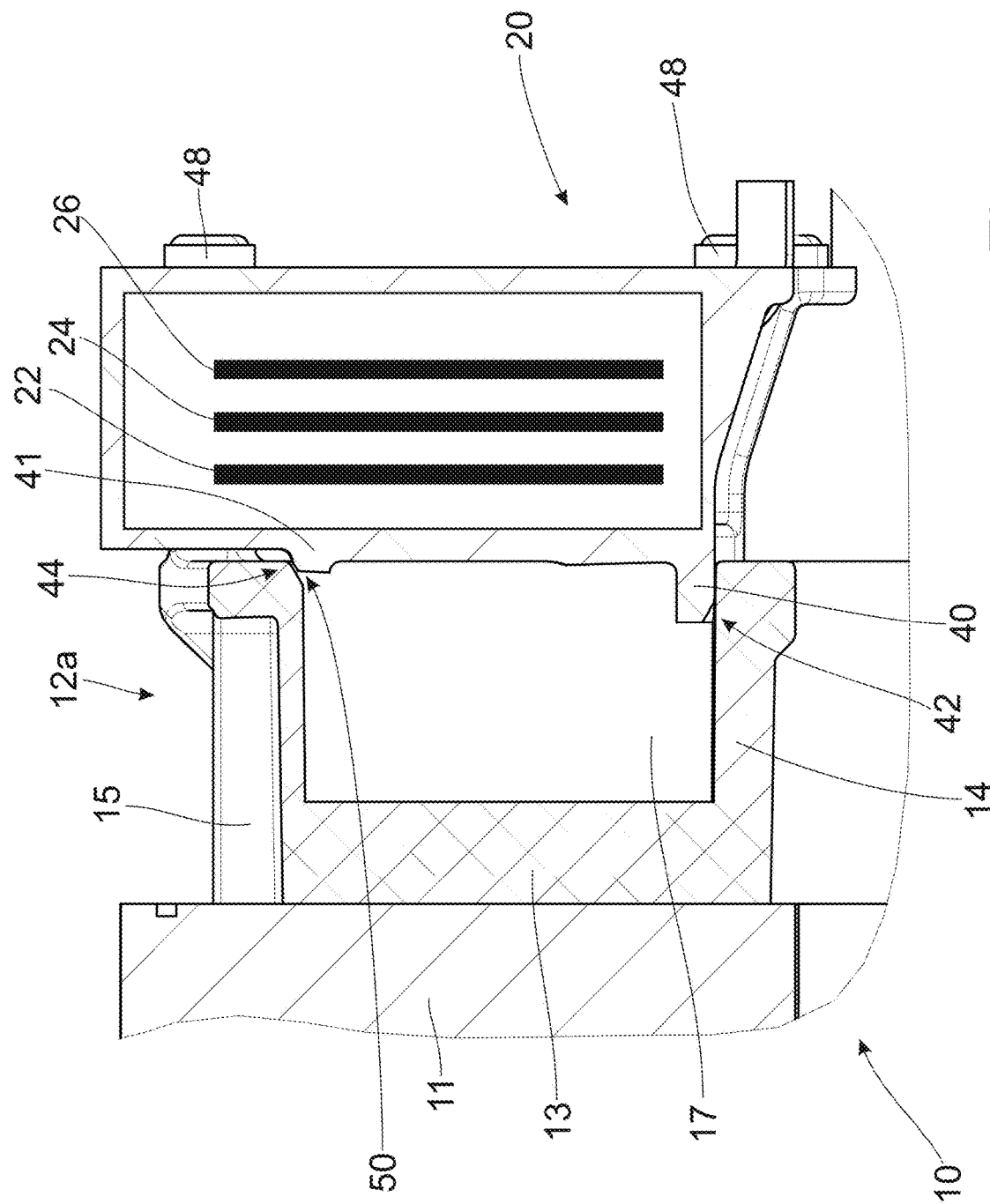
FIG. 5 shows a further axial sectional illustration of the stator of FIG. 2 in a plane outside the connectors shown in FIG. 4.

The precise fastening of the interconnection device 20 can be seen particularly clearly with the aid of FIGS. 2-5, wherein, for better clarity, the coils 16 with the coil ends 16a, b are not illustrated in FIG. 4, 5. The interconnection device 20 is secured on one of the winding formers 12a in each case on the radially outer limb 15 and on the radially inner limb 14. In the exemplary embodiment, a plurality of radially inner and radially outer fastening openings 20a, b, distributed in the circumferential direction, are provided on the interconnection device 20. Corresponding to this radial and circumferential distribution, axial connectors 30a, b in the form of axially projecting pins are formed on the limbs 14, 15, which pins can receive the prefabricated interconnection device 20 until it abuts against shoulder regions 46 of the connectors 30a, b or pins and can then fix it in the assumed axial position, for example by subsequent hot caulking to form head regions 48. The shoulder regions 46 and the head regions 48 of the pins 30a, b therefore represent axial stops which act axially on both sides and between which the interconnection device 20 is secured substantially without play.

The axial connections 32a, b generated by the axial connectors 30a, b have a radial gap 30 or an annular gap 30 between the pins 30a, b and the interconnection device 20, so that the connecting partners permit a mutual radial play in these positions. The axial connectors 30a, b therefore serve for axially securing the interconnection device 20 and are substantially uncoupled and thus relieved from possibly occurring slight radial displacements of the interconnection device 20 with respect to the coils 16.

For a mutually defined radial positioning of the interconnection device 20 and winding formers 20a, radial supports 40, 41 are provided. In the present case, these supports 40, 41 are formed on the interconnection device 20 as in each case two axial projections extending axially in the direction of a winding former 12a. The supports 40, 41 are therefore formed to be structurally separate and functionally independent of the axial connectors 30a, b.

As can be best seen in FIGS. 4, 5, each projection 40, 41 cooperates with one of the two limbs 14, 15 of a winding former 12a and forms a first or a second support region 42, 44 there.

The projections or supports 40, 41 have a first support surface 40a and a second support surface 41a which is radially spaced from said first support surface. In this case, the first support surface 40a and a guide portion 14a, cooperating therewith, of the radially inner limb 14 extend parallel to the center axis A, i.e. along the axial joining direction of the interconnection device 20, and form the first support region 42. The second support surface 41a and a contact portion 15a, cooperating therewith, of the radially outer limb 15 are, on the other hand, constructed at an angle with respect to the center axis A and the joining direction and form a second support region 44.

During the axial joining of the interconnection device 20, a predefined radial positional relationship between the first support surface 40a and the guide portion 14a can be realized, which is independent of a mutual axial position of the connecting partners. On the other hand, if necessary, a radial positional relationship between the second support surface 41a and the contact portion 15a can be generated, which positional relationship is less predefined by comparison, and therefore radially variable within predetermined limits, and is dependent on the radial manufacturing and/or assembly tolerances of the joining partners which exist in each case. In FIGS. 4, 5, a gap 50 can be seen between the second support surface 41a and the contact portion 15a, so that, in this region, there is no mutual contact between the interconnection device 20 and the winding former 12a and no engagement with the second support region 44. This means that, in this case, the interconnection device 20 and/or the arrangement of the winding formers 12a is configured to be ideally circular and engagement in the support region 44 is not required. The centering of the interconnection device 20 with respect to the stator coils 16 therefore takes place merely by the support region 42.

As can be further seen in the figures, the coil connection regions 22a, 24a, 26a are arranged spatially nearer to the first support region 42 than to the second support region 44. Moreover, the support regions 42, 44 are provided radially between the axial connectors 30a, b. Furthermore, the two coil ends 16a, b of a coil 16 exit the winding region 17 together at the inner limb 14 of a winding former 12a. The first support region 42 is formed in each case in a space-saving manner on the stator 10 in the circumferential direction, between the coil ends 16a, 16b of a limb 14.

Although exemplary embodiments have been discussed in the above description, it should be noted that numerous modifications are possible. Furthermore, it should be noted that the exemplary embodiments are merely examples which are not intended to limit the scope of protection, the applications and the structure in any way. Rather, a person skilled in the art will take from the above description a guideline for implementation of at least one exemplary embodiment, wherein various modifications may be made, in particular with regard to the function and arrangement of the described components, without departing from the scope of protection as can be gathered from the claims and equivalent feature combinations

REFERENCE SIGNS

1 Electric machine
8 Rotor
8a Rotor laminated core
8b Permanent magnet
9 Air gap
10 Stator
10a Stator carrier
11 Stator laminated core
11a Stator segment
11b Stator yoke
11c Stator tooth
12a, b Winding former
13 Winding carrier
14 Limb
14a Guide portion
15 Limb
15a Contact portion
16 Coil
16a Coil end
16b Coil end
17 Winding region
20 Interconnection device
20a, b Fastening opening
22 Connecting conductor
22a Coil connection region
22b Power connection region
24 Connecting conductor
24a Coil connection region
24b Power connection region
26 Connecting conductor
26a Coil connection region
26b Power connection region
30a, b Axial connectors
33 Radial gap
32a, b Axial connection
40 Radial supports
40a Support surface
41 Radial supports
41a Support surface
42 First support region
44 Second support region
46 Axial stop
48 Axial stop
50 Gap
60 Power electronics
62 Control electronics
64 Energy source
A Center axis

The invention claimed is:

1. A stator (10) of an electric machine (1), comprising:
an annular laminated core (11) which is formed around a center axis (A) and on which stator coils (16) with coil ends (16a, b) are arranged by winding formers (12a, 12b), and having an interconnection device (20) having a plurality of mutually insulated connecting conductors (22-26), which have coil connection regions (22a-26a) for the interconnection of the stator coils (16), wherein the interconnection device (20) is joined to the stator coils (16), and arranged adjacent thereto, in an axial joining direction and is secured to the winding formers (12a) by axial connectors (30a, b) to form a multiplicity of axial connections (32a, b),
wherein:
the interconnection device (20) has radial supports (40, 41) for cooperating with the winding formers (12a), which are formed independently of the axial connectors (30a, b), and
the axial connections (32a, b) have a radial gap (33) for generating a radial play.

2. The stator as claimed in claim 1, wherein each winding former (12a) has a winding region (15), formed by a winding carrier (13) and two limbs (14, 15) delimiting the winding region (15) in the axial direction and connected to the winding carrier (13), wherein the axial connectors (30a, b) are formed on the limbs (14, 15) of the respective winding formers (12a) and wherein the radial supports (40, 41) cooperate with at least one of the limbs (14, 15) of the plurality of winding formers (12a).

3. The stator as claimed in claim 2, wherein the radial supports (40, 41) are configured to cooperate with both limbs (14, 15) on one of the winding formers (12a) and form a first and, if necessary, a second support region (42, 44), wherein a centering of the interconnection device (20) with respect to the stator coils (16) takes place by only one of the two support regions (42, 44).

4. The stator as claimed in claim 3, wherein the radial supports (40, 41) have a first support surface (40a) and a second support surface (41a) radially spaced from the first support surface, wherein the first support surfaces (40a) and a guide portion, cooperating therewith, of one of the limbs (14) extend parallel to the center axis (A) and form the first support region (42) and wherein the second support surface (41a) and a contact portion (15a), cooperating therewith, of the other limb (15) are formed at an angle with respect to the center axis (A) and form the second support region (44).

5. The stator as claimed in claim 4, wherein the coil connection regions (22a-26a) of the connecting conductors (22-26) are arranged adjacent to a support region (42) resulting in the centering of the interconnection device (20).

6. The stator as claimed in claim 5, wherein the support regions (42, 44) Are formed radially between the axial connectors (30a, b).

7. The stator as claimed in claim 6, wherein the two coil ends (16a, b) of a coil (16) exit the winding region (17) at the same limb (14, 15) of one of the winding formers (12a), wherein the first support region (42) is formed on the stator (10) in the circumferential direction, between these coil ends (16a, 16b) of the limbs (14, 15).

8. The stator as claimed in claim 7, wherein the mutual axial position of the interconnection device (20) and the coil formers (12a) is secured substantially without play by axial stops (46, 48), which act axially on both sides and are formed by the axial connectors (40, 41).

9. An electric machine (1) comprising a rotor (8) and the stator (10) as claimed in claim 1.

* * * * *